United States Patent
Villgrattner et al.

(10) Patent No.: US 12,429,859 B2
(45) Date of Patent: Sep. 30, 2025

(54) METHOD FOR CONTROLLING A PRODUCTION PROCESS FOR PRODUCING COMPONENTS

(71) Applicant: GKN Sinter Metals Engineering GmbH, Radevormwald (DE)

(72) Inventors: Thomas Villgrattner, Brixen (IT); Gottfried Rier, Bruneck Dietenheim (IT); Meinhard Ploner, Bruneck (IT); Christina Messner, Bruneck St. Georgen (IT)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 565 days.

(21) Appl. No.: 17/636,769

(22) PCT Filed: Aug. 17, 2020

(86) PCT No.: PCT/EP2020/073026
§ 371 (c)(1),
(2) Date: Feb. 18, 2022

(87) PCT Pub. No.: WO2021/032696
PCT Pub. Date: Feb. 25, 2021

(65) Prior Publication Data
US 2022/0283574 A1    Sep. 8, 2022

(30) Foreign Application Priority Data
Aug. 19, 2019  (EP) ...................... 19192222

(51) Int. Cl.
*B29C 45/00* (2006.01)
*G05B 19/418* (2006.01)

(52) U.S. Cl.
CPC ............. *G05B 19/41875* (2013.01); *G05B 2219/32368* (2013.01)

(58) Field of Classification Search
CPC .... G05B 19/41875; G05B 2219/32368; G05B 2219/32199; G05B 2219/50065
See application file for complete search history.

(56) References Cited

U.S. PATENT DOCUMENTS

| | | | |
|---|---|---|---|
| 6,070,130 A | 5/2000 | Gutmann et al. | |
| 6,766,214 B1 * | 7/2004 | Wang | G05B 19/41865 700/109 |
| 2002/0183949 A1 | 12/2002 | Chen et al. | |
| 2013/0270728 A1 * | 10/2013 | Denes | B29C 45/762 425/135 |
| 2016/0054231 A1 * | 2/2016 | Hess | G01N 21/8806 702/82 |
| 2018/0276811 A1 | 9/2018 | Wen et al. | |
| 2018/0293500 A1 * | 10/2018 | Delp | G06F 11/2263 |
| 2019/0163614 A1 * | 5/2019 | Meliou | G06F 11/3688 |

FOREIGN PATENT DOCUMENTS

| | | | | |
|---|---|---|---|---|
| CN | 107368125 B | * | 6/2019 | ............. G05D 23/20 |
| DE | 102004063388 A1 | * | 7/2006 | ........... G06K 9/6267 |
| DE | 102016215624 B3 | * | 7/2017 | |
| JP | 2011185847 A | * | 9/2011 | |
| WO | 2004095154 A1 | | 11/2004 | |

OTHER PUBLICATIONS

Hananatsy et a, "Statistical Threshold Method for Semiconductor Inspection" (Year: 2006).*
PCT International Search Report and Written Opinion and translation thereof, PCT/EP2020/073026 Dec. 4, 2020, 25 pages.
Rodrigues et al., "Adaptation of functional inspection test plan in a production line using a multi-agent system," Industrial Electronics (ISIE), 2013 IEEE International Symposium May 28-31, 2013 in Taipei, Taiwan, XP032439462, 6 pages.

* cited by examiner

*Primary Examiner* — Eyob Hagos
(74) *Attorney, Agent, or Firm* — Quarles & Brady LLP

(57) ABSTRACT

A method for controlling a production process for components, wherein the components or a production device used for producing the components have or has features which are metrologically detectable. The method comprising specifying a test plan for detecting primary feature(s) and secondary feature(s) by tests, wherein the primary feature(s) is/are measured at a first test frequency and the secondary feature(s) is/are measured at a second test frequency, wherein at least one stability criterion is defined for the primary feature(s); producing the components and carrying out the test plan for producing test results in parallel, wherein solely the primary feature(s) is/are tested at the first test frequency; evaluating the determined test results; and, if at least one test result for the primary feature(s) violates the stability criterion, continuing the carrying out of the test plan, wherein at least a secondary feature is tested.

13 Claims, No Drawings

METHOD FOR CONTROLLING A PRODUCTION PROCESS FOR PRODUCING COMPONENTS

This application represents the U.S. national stage entry of International Application No. PCT/EP2020/073026 filed Aug. 17, 2020, which claims priority to European Patent Application No. 19192222.8 filed Aug. 19, 2019, the disclosure of which is incorporated herein by reference in its entirety and for all purposes.

The present disclosure relates to a method for controlling a production process, wherein components are produced by the production process.

During the production of mass-produced components, various quality and process measurements are regularly carried out. These measurements are generally carried out as random sampling. For example, a particular feature (for example a weight of a component produced by sintering technology) may be detected at regular time intervals respectively from a particular number of components. Further measurements relate for example to other features of the component, for example a length, a density, a parallelism of surfaces or a diameter of the component. As an alternative thereto or in addition, process parameters, for instance the pressure profile of a machine during the pressing process for producing so-called green compacts, may also be detected at time intervals.

By purely statistical establishment of test intervals, the continuously changing risks that arise in a real process are not taken into account. In the case of stable processes in which components are produced with a consistently high quality, too many measurements are therefore usually carried out. Avoidable costs are thereby incurred. In the case of unstable processes, on the other hand, there is the risk that errors will not be identified adequately because of an insufficient number of measurements.

On the basis thereof, it is an object of the present disclosure at least to alleviate, or even to resolve, the problems explained in relation to the prior art. In particular, the intention is to provide a method for controlling a production process for producing components, in which a testing outlay is managed as a function of a stability of the production process.

In order to achieve these objects, a method is proposed. The individual features referred to in the claims may be combined with one another in a technologically expedient way and may be supplemented with explanatory technical content from the description, further alternative embodiments of the invention being presented.

A method for controlling a production process for components, that is to say for the production of components, is proposed. At least the components or a manufacturing device used for producing the components have a multiplicity of metrologically detectable features (for example a volume, a weight, a density, a parallelism of surfaces or a diameter of the component; a temperature, a pressure, a power consumption of the manufacturing device). At least one feature is defined as a main feature and at least one further feature is defined as a secondary feature. The method has at least the following steps:
  a) establishing a test plan for detecting the at least one main feature and the at least one secondary feature by tests (that is to say for example by a measurement), the at least one main feature being measured with (a first value of) a first test frequency and the at least one secondary feature being measured with a second test frequency; wherein at least one stability criterion is defined for the at least one main feature;
  b) producing the components and in parallel carrying out the test plan in order to generate test results, only (temporarily) the at least one main feature being tested with the first test frequency;
  c) evaluating the test results which have been determined; and, if at least one test result for the at least one main feature violates the stability criterion,
  d) continuing to carry out the test plan, the at least one secondary feature at least also being tested.

In the present case, it is proposed to use correlations between the various features of a component and/or of a manufacturing device. For this purpose, for example, an individual quality feature and/or process feature (or a small group) is established as a main feature. This main feature may in particular be measured in an automated fashion, and preferably for each component produced. The other features (secondary features) are measured in particular with a much lower test frequency (that is to say not for all the components); in the ideal case, seldom to not at all.

In particular, only one main feature is established and included in the test plan.

From the measurement value profile of the main feature (or of the small group of main features) as a function of time and from correlations of all the features with one another, prognoses may in particular be derived relating to the quality status of a measured component. If distribution variations for the main feature(s) lead to an increased probability of a possible tolerance violation for one or more of the other features of the component, additional measurements (and if necessary process corrections) are in particular (automatically) instigated for these features. The process stability is monitored in particular only by means of the main feature.

Particularly by the use of IoT (Internet of Things) technologies, in modern manufacturing devices it is possible to detect and store particular features and their test results in an automated fashion for each individual component produced. These features may correspond either to quality features or process features. A weight (of the component) or a pressing force (of the manufacturing device) may be mentioned here by way of example. This leads in particular to a much higher measurement rate (for example 15 measurements per minute, corresponding to a 15 stroke production speed) compared with a conventional test plan (for example 5 measurements every two hours). It is therefore possible, in particular, to detect trends of features preferably over 100% of all the components produced, without manual ("expensive") measurements of the features being necessary (for example by removing the components and carrying out a measurement in a laboratory which is not part of the manufacturing device, or the like).

A manufacturing device may for example comprise a pressing apparatus, a sintering furnace or a complete manufacturing installation with a pressing apparatus and sintering furnace. Furthermore, a manufacturing device may also for example comprise a workshop in which a pressing device and/or a sintering furnace are arranged. For example, a temperature of the ambient air, an air humidity or an air composition (proportions of protective gas/oxygen, etc.) may also be detected as features.

In particular, it may be assumed that there are a minimum number of main features which correlate directly with the quality of the components produced. It may furthermore be assumed that, if there is a stable equilibrium for this minimum number of main features (that is to say for example no negative trend is apparent), more extensive tests for monitoring the quality are not necessary.

If trend variations of main features (for example violation of limit values, drifts upward or downward, oscillations within the limit values, atypical constellation of the features, variances, . . . ) lead to an increased probability of a tolerance violation (or of a violation of the stability criterion) in respect of one or more features (in other words: if a negative prognosis is made), additional measurements for the relevant features should (automatically) be instigated.

The relevant features are in particular the features which are covered by the prognosis, the prognosis being made by observation of the at least one main feature.

Process corrections which are required as necessary may, in particular, be carried out on the basis of all the test results (that is to say of main features and secondary features). In this case, not only the test results of the ongoing production of components but in addition also historical data of earlier production runs may be employed.

A production process comprises the production of a component, for example the production of a component by sintering technology. In this case, for example, a material in powder form is provided, pressed to form a green compact and subsequently treated by sintering technology (that is to say thermally). Machining may optionally be carried out. In the scope of the production process, in particular a multiplicity (for example at least 100, 1000 or several tens of thousand) of ideally mutually identical components are produced.

For example, a weight of a component produced by sintering technology may be detected as a main feature to be detected, and for example a length, a density, a parallelism of surfaces or a diameter of the component may be detected as a further main feature or as a secondary feature. Furthermore, a burr or an appearance of a surface of the component, for example matt or gloss, etc., may also be defined as a feature. A feature of a manufacturing device, for example an applied pressure, for example a pressing pressure (as a main feature) or a power consumption (for example as a secondary feature), may likewise be detected.

A first value of the first test frequency may, for example, represent an initial value for a newly started process of producing the component or components. This value may, for example, comprise a test on one component per 1000 components or testing of a random sample of a plurality of components (for example on five components produced in direct succession) per 1000 components, or the like. As an alternative or simultaneously, the first test frequency may be established as a function of a period of time of the production process. Then, for example, a feature of a manufacturing device may be detected or a test may be carried out (on one or more components) every hour of the production process. Optionally, the number of components that have been produced in the period of time, or have undergone an established processing step, may in this case be taken into account.

The test results may be determined from the assessment of respectively only a single value (of the test result of the tested feature), or respectively a plurality of values. The evaluation or assessment of a plurality of values may be based on mathematical methods, for example averaging and/or the standard deviation within a random sample.

A stability criterion may be established as a defined deviation from a setpoint value for the respective feature. In this case, the stability criterion need not in particular correspond to an allowed tolerance (a value outside the tolerance would mean, for example, that the component is not right, that is to say is defective) for the setpoint value. In particular, the tolerance is framed more widely than the stability criterion. Accordingly, a component would not necessarily be defective (and therefore may still lie within the tolerance) if the first feature violates the stability criterion.

In particular, a violation of the stability criterion may also depend on a method with which, for example, a random sample of components that has been checked during sampling is evaluated.

For example, a number may be defined as a subset of the components of a random sample (the random sample comprises, for example, five components), beyond which violation of the stability criterion is identified. There must thus be a minimum number of components of a random sample (that is to say for example at least two components out of the random sample of five components), which for example have a certain minimum deviation from a nominal value of the first feature, violation of the stability criterion only then being identified.

By means of the violation of the stability criterion, a process instability may in particular be identified, so that a possible impending noncompliance with the tolerance may be prevented by corrective intervention in the production process.

The stability criterion may, for example, be based on an extent of a variation of a test result. In particular, it may be concluded that there is a violation of the stability criterion if a trend or a possibly sporadically occurring abrupt variation arises in the test results.

In particular, the production of the components and the conduct of the test plan, that is to say carrying out measurements of the first feature, take place chronologically in parallel with one another.

In particular, the first test frequency comprises testing of at least 50% of the components (i.e. the relevant feature of the component or of the manufacturing device is tested for at least 50% of all the components), preferably at least 75%, particularly preferably 100%.

In particular, the second test frequency differs from (that is to say is higher or lower than) the first test frequency. In particular, the second test frequency is lower or even much lower than the first test frequency. Preferably, the second test frequency in total involves in particular carrying out at most 50% (preferably at most 20%, particularly preferably at most 5%) of a number of tests which are carried out on the basis of the first test frequency. In particular, temporarily only the at least one main feature is tested, the at least one secondary feature being tested at a much lower second test frequency (continuously and while overlapping with the first test frequency).

Preferably, the second test frequency comprises testing of 0% of the components and testing of at least one secondary feature is performed only if a stability criterion of the at least one main feature is violated.

In particular, at least one (and preferably only one) main feature is detected in one or more process steps at the first test frequency. If it lies within predefined limit values (that is to say the stability criterion is not violated) for a predefined time, in particular more extensive tests or measurements are not carried out. If the limit values of the stability criterion are violated, in particular all the features are detected and tested according to the test plan.

In particular, the individual main feature is for example the weight of a component. In particular, at least the one main feature is tested in an automated fashion in the scope of the production of the component. In the case of the weight of a component, in particular, the relevant number of components may be weighed. In the case of a pressure/pressing pressure, for example, the pressure applied by the manufacturing device may be detected for the relevant number of components.

In particular, changes in the variability or the distribution properties of the test results of the at least one main feature may (additionally) be employed as a trigger for carrying out additional measurements, or all the measurements, according to the test plan.

In particular, there are at least a multiplicity of secondary features, the violation of a stability criterion of a main feature entailing the testing only of a selection of the secondary features. In particular, in this way not all the secondary features identified in the test plan, but only a selection of the secondary features are tested. In particular, testing of further secondary features or a change of the selection may successively be carried out.

In particular, there are a multiplicity of main features (for example weight and surface color of the component), the violation of a stability criterion of one main feature (for example weight) entailing the testing of a first selection of the secondary features (for example length, width of the component; pressure of the manufacturing device) and the violation of a stability criterion of another main feature (for example surface color) entailing the testing of a second selection of the secondary features (for example composition of the starting materials for the component, temperature in the manufacturing device, pressure in the manufacturing device).

In particular, the violation of a stability criterion comprises at least one of the following states:
the test results follow a trend (they increase or decrease continuously);
the test results fluctuate within an interval which exceeds limit values defined by the stability criterion;
the test results of at least various main features deviate from a predefined correlation of the main features (for example the weight and volume, or height, length, width; or weight and pressure depend on one another).

In particular, in the event of changing test results (for example if there is a trend or in the event of an abrupt change or if excessively large intervals occur) of the main feature or of the main features, a test of further features (or all of the features) mentioned in the test plan, which are defined in the test plan, may be initiated. In particular, the relevant test frequencies are increased only for those features which exhibit test results with the stated properties.

In particular, in the event of changing test results (for example if there is a trend or in the event of an abrupt change or if excessively large intervals occur) of the main feature or of the main features, only a selection of features (that is to say not all the features from the test plan) may be tested. The selection of features may, in particular, be established by technical experts. Optionally, the selection may be made again in each case, or alternatively a fixed selection may be stored in the test plan.

At the start of a production process of components, for example, the weight of the components produced may be continuously detected and considered as a main feature. In a further step, further main features may be added or may replace previously used main features. For example, a pressing force or a pressure applied to the component by the manufacturing device, or individual dimensions of the components produced, could be envisioned as further main features.

In particular, at least the first test frequency is varied,
(either) the first test frequency being increased if at least one test result for the at least one main feature violates the stability criterion; or
the first test frequency being reduced if a particular number of successive test results at least of the at least one main feature are in accordance with the stability criterion.

In particular, the first test frequency (which is assigned to the at least one main feature or to all the main features) is varied, that is to say the first value of the first test frequency is adjusted to a different, second value of the first test frequency. The first test frequency is in this case increased if, for example, at least one test result for the at least one main feature violates the stability criterion. On the other hand, the first test frequency is reduced if all the test results are in accordance with the stability criterion.

It is thus proposed here that, if the production process is running stably (and the test results at least for the at least one main feature do not have a sizeable deviation, that is to say test results are in accordance with the stability criterion), the first test frequency may be reduced.

If a possible instability of the production process is identified (i.e. for example at least one test result at least for the at least one main feature has a sizeable deviation, that is to say the test result violates the stability criterion), the first test frequency may be increased.

The technical expert will for example employ a so-called intervention limit, a tolerance limit, or a stability limit for the definition of a stability criterion. Thus, if the test results of the feature to be tested lie within the defined limits, the test frequency is successively reduced.

In the converse case, the test frequency is increased as soon as the test results of the feature to be tested lie outside defined limits, since this limit crossing shows a higher quality risk for the component.

Under stable conditions of the production process, measurements of features to be tested may therefore be reduced to a minimum while a high quality of the components produced is nevertheless ensured.

In particular on the basis of computer-assisted measurement value detection and measurement value registering, test results may be analyzed constantly and assessed as to whether the production process is stable or whether interventions in the production process are necessary.

On the basis of the measurements carried out and the test results resulting therefrom, it is possible in particular to detect a trend in the variation of a feature (for example a weight or a height). If the test results lie within defined limit values (they satisfy the stability criterion) over a defined period of time or over a particular number of random samples, it may be inferred therefrom that the process is running stably for the tested feature in question and the test frequency may therefore be reduced. This reduction may also be carried out in stages, and in the ideal case the test frequency may be set to a defined minimum.

If, however, one or more test results violate at least one stability criterion during a test, this indicates an unstable production process and the test frequency is increased, or further features (main features and/or secondary features) are tested, and the production process is therefore monitored more closely. In parallel, an intervention in the production process may be carried out in order to restore the process stability, including the removal of components suspected to be defective. The higher test frequency, or the testing of further features, ensures that the production process is monitored more closely for a defined period of time. Only when the test results satisfy the at least one stability criterion over a defined period of time or over a particular number of random samples, or components, may the test frequency and/or the number of features monitored be reduced again (in stages).

In particular, at least main features (and optionally additionally secondary features) are linked to one another by a model, a variation of other main features or secondary features being inferred with the aid of test results of at least one main feature by taking the model into account. Testing of at least one of these main features or secondary features is initialized as soon as the violation of a stability criterion assigned to this feature is prognosed.

For example, a continual increase of the weight of a component may be used as a basis for a prognosis. According to the prognosis, a future violation of a stability criterion may be predicted. Tests of further features may already be instigated with the aid of this prognosis, so that corrective intervention in a manufacturing process may possibly be performed promptly (possibly before the violation of a stability criterion).

In particular, sensitivity and dependency analyses may be carried out. Both the main features and their influence on the rest of the (secondary) features may be identified on the basis thereof. With these analyses, the intention is likewise in particular to determine the test frequency with which the main features need to be detected, whether for instance with a high frequency (for example 100% of the components) or perhaps only by periodic measurements with a fixed time interval and/or production interval. In particular, derived main features which are not directly measurable, but which may in particular be calculated from a plurality of measured features, are provided. One example is, for example, the density of a component, calculated from measured weight and the volume (which is in turn derived, for example, from the measured component height).

In particular, a model which can estimate the distribution of the values of the rest of the features from the values of the main features is compiled. The model is based, in particular, on the aforementioned sensitivity analyses and dependency analyses. Measurements of features are, in particular, instigated automatically if an increased probability of a prognosed tolerance violation or violation of a stability criterion by one or more features is calculated, or if the prognosis interval (measuring the uncertainty) of an estimated feature becomes too large. The test results which the automatically instigated measurements deliver are used, in particular, in order to validate the model and/or to improve it online (in real time).

In particular, the model is validated and varied continuously with the aid of the tests carried out and the test results.

A validation status of the model, expressed particularly in the binary decision (classification) "good" or "bad", may be linked with the widely known term of model quality in such a way that a model quality that has been determined as not lying in a defined bandwidth equates to the state of a violation of a stability criterion.

Automatically instigated measurements, or tests, are in particular used not only to validate the model but also to extend it. For example, features that are measured may be associated with a higher confidence than features which are only estimated. The features measured as a result of the automatic instigation may therefore temporarily become main features, which may in turn be used to instigate more extensive measurements, or to replace existing measurements.

In particular, at least one of the following factors is taken into account by the model for the selection of the main feature or secondary feature additionally to be tested:
   cost of the additional test;
   time expenditure of the additional test;
   availability of the required measuring device.

In particular, for an automatic instigation of the measurements or tests, the boundary conditions of these measurements are (likewise) depicted in the model, with the aim of always using the most favorable measurements. For example, the outlay, the cost, the duration, a utilization level of the measuring system, the reliability of the measurement, etc. are jointly modeled and taken into account for the selection of the measurements.

In particular, the additionally instigated measurements or tests are evaluated purposefully. Multiple instigation may, for instance, indicate systematic or "insidiously occurring" errors in processes and/or machines/tools. These errors need to be identified and subsequently eliminated. Dynamic adaptations of maintenance intervals of installations on the basis of the frequency of feature measurements may also be envisioned.

In particular, the main features and the dependencies (with other features) may be identified again for each new product or each new process. In order to reduce this outlay, however, classes of products/processes in which there are similar behaviors/requirements may in particular be determined. To this end, the already available measurement values (for example from quality, process and machine data) may for example be evaluated in respect of pattern similarity in the deviations.

Furthermore, dependencies may be established between these patterns and the component properties to be produced (for example size, weight, geometry, density, . . . ). By comparing a component newly to be produced with components produced already, a suitable base model class (which defines the recommended tests) may be proposed for the new component.

In particular, the base models to be developed are increasingly generic. Once determined, they are in particular very easy to adapt to various new products and/or processes. For this purpose, more measurements may be carried out at the start of a new production run. The model parameters and the associated confidence intervals may, in particular, be adapted in an automated fashion. As soon as a predefined stability criterion is reached, the model may be activated (and used for the method), measurements or tests thereupon being carried out only as required.

The stability criterion could, for example, be calculated from the main features and the confidence intervals of the rest of the features. Specific example of the "good case" (i.e. for the case of a functioning model): the main features behave "inconspicuously" and the confidence intervals lie within predefined limit values for a predefined time.

In particular, the test plan for a component to be produced is compiled at least partially in an automated fashion during the production of the component by identifying at least one main feature and one secondary feature with the aid of test results of features.

In particular, in addition to the testing of the at least one main feature that has been identified, a multiplicity of other features may be periodically tested in order to validate the test plan.

In particular, in addition to the test results, for example the model parameters, the behavior of the parameters and features during the learning process and the number and type of the (automatically) instigated measurements or tests, etc. are stored at the end of a production run. This information may also be incorporated during the next production run, in particular automatically, into the trained model and the performance of the latter may thus be improved successively.

In particular, the need for the automation of measurements may be derived on the basis of the evaluation of the (automatically) instigated measurements or tests over all the products and processes.

In particular, the production of the component comprises a multiplicity of process steps, a feature being present, and being tested, after a first process step, and a (metrologically detectable) further feature being present after a second process step chronologically following the first process step.

An apparatus for data processing is furthermore proposed, comprising a processor which is configured in such a way that it carries out the described method.

As a precaution, it should be pointed out that the numerals employed here ("first", "second", "third", . . . ) are used primarily (only) to distinguish between a plurality of objects, quantities or processes of the same type, that is to say in particular they do not necessarily specify any dependency and/or order of these objects, quantities or processes with respect to one another. If a dependency and/or order is required, it is explicitly indicated here or is readily apparent to the person skilled in the art on studying the configuration specifically described.

The invention claimed is:

1. A method for controlling a production process for components produced by sintering technology in which a material in powder form is provided, pressed to form a green compact using a pressing apparatus, and subsequently sintered using a sintering furnace, wherein at least the components or a manufacturing device used for producing the components have a multiplicity of metrologically detectable features, at least one feature being defined as a main feature of the components or the manufacturing device used for producing the components and at least one further feature being defined as a secondary feature of the components or the manufacturing device used for producing the components; the method having at least the following steps:

a) establishing a test plan for detecting at least one main feature and at least one secondary feature by tests, the test plan defining that the at least one main feature is to be measured with a first test frequency and defining that the at least one secondary feature is to be measured with a second test frequency; wherein the test plan further defining at least one stability criterion for the at least one main feature and the at least one secondary feature; wherein the stability criterion is established as a defined deviation from a setpoint value for the respective feature;

b) producing the components using sintering technology and in parallel carrying out the test plan in order to generate test results, only the at least one main feature being tested with the first test frequency;

c) evaluating the test results which have been determined;

and, upon at least one test result for the at least one main feature violating the stability criterion, d) continuing to carry out the test plan, the at least one secondary feature at least also being tested;

wherein, upon the stability criterion of the at least one main feature being violated this is indicative of a process instability of the production process using sintering technology, and then the at least one secondary feature is tested, wherein in parallel, a corrective intervention by correcting an operation of the pressing apparatus and/or the sintering furnace is carried out in order to restore the process stability to prevent a possible impending noncompliance with a tolerance beyond which point the component is defective;

wherein, if the test results satisfy the stability criterion over a defined period of time or over a particular number of random samples or components, then the test frequency for at least one secondary feature is reduced; wherein the second test frequency is lower than the first test frequency.

2. The method as claimed in claim 1, wherein the first test frequency comprises testing of each component.

3. The method as claimed in claim 1, wherein at least the at least one main feature is tested in an automated fashion during the production of the component.

4. The method as claimed in claim 1, wherein there are at least a multiplicity of secondary features, the violation of the stability criterion of the at least one main feature entailing the testing only of a selection of the secondary features.

5. The method as claimed in claim 4, wherein there are a multiplicity of main features, the violation of a stability criterion of one main feature entailing the testing of a first selection of the secondary features and the violation of a stability criterion of another main feature entailing the testing of a second selection of the secondary features.

6. The method as claimed in claim 1, wherein the violation of a stability criterion comprises at least one of the following states:
   the test results follow a trend;
   the test results fluctuate within an interval which exceeds limit values defined by the stability criterion;
   the test results of at least various main features deviate from a predefined correlation of the main features.

7. The method as claimed in claim 1, wherein at least the first test frequency is varied,
   the first test frequency being increased if at least one test result for the at least one main feature violates the stability criterion; or
   the first test frequency being reduced if a particular number of successive test results at least of the at least one main feature are in accordance with the stability criterion.

8. The method as claimed in claim 1, wherein at least main features are linked to one another by a model, a variation of other main features or secondary features being inferred with the aid of test results of at least one main feature by taking the model into account; wherein testing of at least one of these main features or secondary features is initialized as soon as the violation of a stability criterion assigned to this feature is prognosed.

9. The method as claimed in claim 8, wherein the model is validated and varied continuously with the aid of the tests carried out and the test results.

10. The method as claimed in claim 8, wherein at least one of the following factors is taken into account by the model for the selection of the main feature or secondary feature additionally to be tested:
    cost of the additional test;
    time expenditure of the additional test;
    availability of the required measuring device.

11. The method as claimed in claim 1, wherein the test plan for a component to be produced is compiled at least partially in an automated fashion during the production of the component by identifying at least one main feature and one secondary feature with the aid of test results of features.

12. The method as claimed in claim 11, wherein in addition to the testing of the at least one main feature identified, a multiplicity of other features are periodically tested in order to validate the test plan.

13. An apparatus for data processing, comprising a processor which is configured in such a way that it carries out the method as claimed in claim 1.

* * * * *